July 11, 1961

R. H. ELSKEN 2,992,120

TELEMETERING SYSTEM

Filed July 2, 1958

2 Sheets-Sheet 1

R.H. ELSKEN
INVENTOR

BY

ATTORNEY

R. H. ELSKEN
INVENTOR

BY

ATTORNEY

United States Patent Office 2,992,120
Patented July 11, 1961

2,992,120
TELEMETERING SYSTEM
Richard H. Elsken, Walnut Creek, Calif., assignor to the United States of America as represented by the Secretary of Agriculture
Filed July 2, 1958, Ser. No. 746,304
5 Claims. (Cl. 99—192)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the United States of America.

This invention relates in general to measuring the temperature of commodities. More particularly, the invention relates to and has among its objects the provision of apparatus and methods for determining the temperature of commodities which are relatively inaccessible to conventional instrumentation, for example, where the commodity is a package of frozen food situated within a case packed with similar packages.

Figure 2:
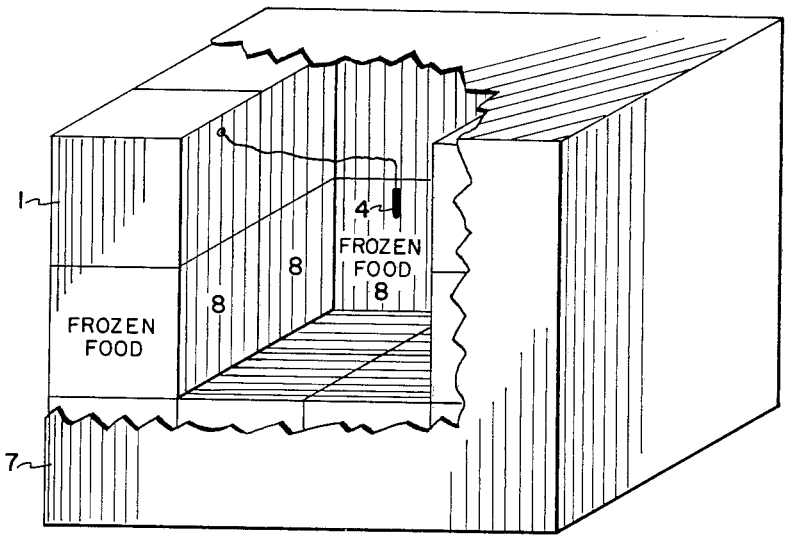
Figure 1:
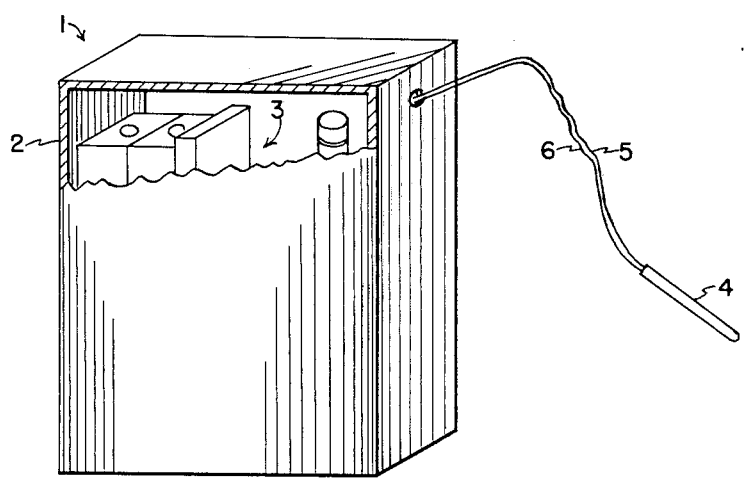
Figure 3:
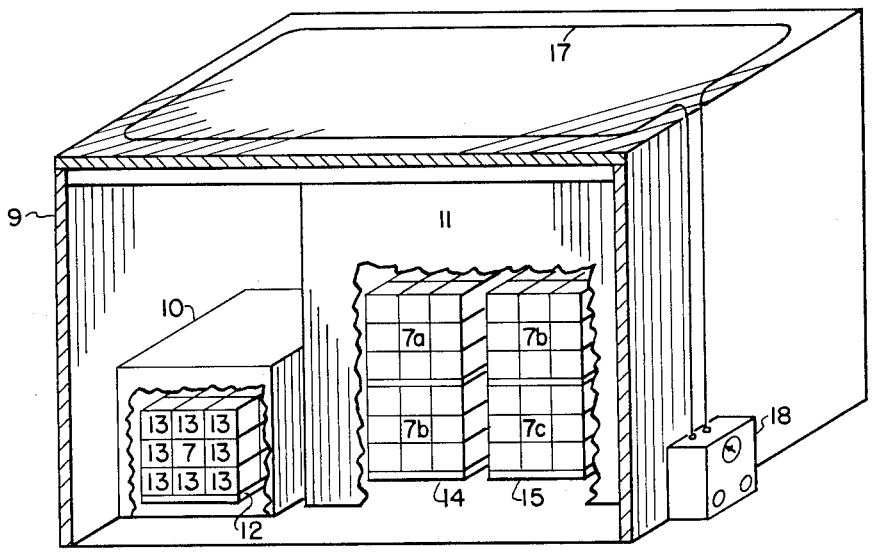
Figure 4:
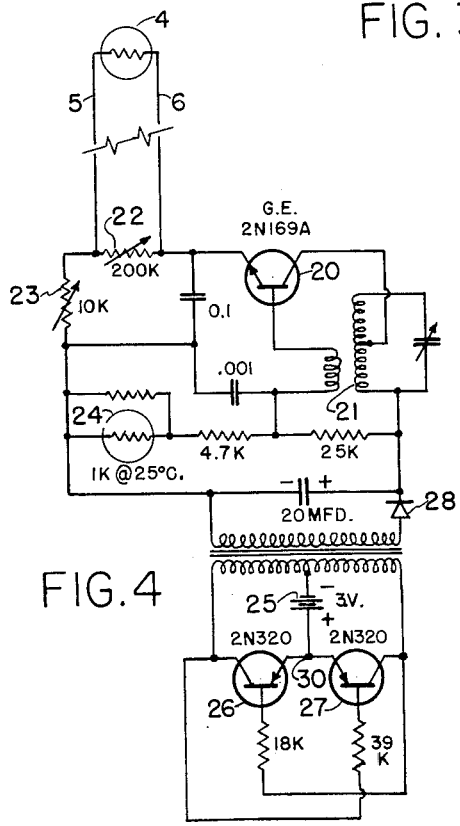
Figure 5:
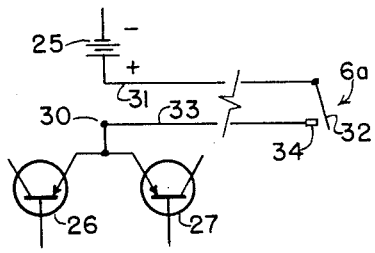

The above and other objects of the invention will be apparent from the description herein taken in connection with the annexed drawing, wherein:

FIG. 1 illustrates the telemetering unit;
FIG. 2 illustrates a case of food packages with the telemetering unit in place for use;
FIG. 3 illustrates a plant layout employing the telemeter-equipped cases of FIG. 2;
FIG. 4 illustrates the wiring diagram of the telemetering unit; and
FIG. 5 illustrates an alternative form of the telemetering circuit.

In the processing of various materials it is often necessary to keep a constant check on the temperature of the material. For example, in the production of frozen foods it is essential to provide such measurements at various stages in the manufacturing procedure. Thus where the fresh food is placed in the freezer, means is required to determine when the food has become properly frozen. Then when the frozen produce is moved to a warehouse, a constant check of its temperature is essential because good quality is dependent on temperature. It is well known that quality suffers irreversible damage if the food is subjected to temperatures above certain levels. For many products, storage at zero is required and at levels above this, quality losses occur.

The determination of temperature in the frozen food field is difficult because of the factor of inaccessibility of the material to be tested. This in turn is due to the characteristic way in which such commodities are handled in the factory. Thus individual packages of food are packed into cases containing 12, 24, or more packages and these cases are assembled into pallet loads of 24 or more cases. The entire pallet load of cases is then treated as a unit for freezing or warehousing. For example the pallet load of fresh produce may be first run into a freezer unit to freeze the food, then the pallet load is taken from the freezer and put into a warehouse where it is kept at subfreezing temperature until ready for shipment or use. Since these pallet loads of food contain a large mass of material, there may be a very considerable difference between the temperature of material near the outside of the load as compared to that near the center of the load. This is particularly the case when the load is subjected to a change in ambient temperature. In such case there will be considerable lag in temperature change as regards the food deep within the load—much more so than the lag as regards material near the surface of the load. Consequently, taking temperatures by holding a thermometer or thermocouple near the exterior of the load offers no real measurement as it does not take into account the entirely different conditions within the mass. Another item of inaccessibility is that often it is difficult to get to the pallet loads because of their being within a freezing compartment or within a warehouse and surrounded by loads of other produce.

This invention offers a solution to this problem of inaccessibility and provides information as to temperatures at any desired location deep within masses of commodities. Moreover, such provision of temperature information is available regardless of the movement or positioning of the commodity mass so that temperature of the mass can be followed through the various stages in the factory or even further as the mass is shipped or stored in intermediate warehouses, retail outlets, etc.

Basically, this invention makes use of a miniaturized telemetering device. This device is, in essence, a miniature radio independently-powered, automatically-operating, temperature-compensated transmitter which continuously broadcasts information as to the temperature to which a probe cooperative therewith is subjected. Reference is made to FIG. 1 wherein is depicted the telemetering unit, generally designated as 1. The unit includes a paperboard container 2 within which is placed transmitter 3. A temperature-sensing probe 4 is connected through wires 5 and 6 to the transmitter 3. Probe 4 can be placed in any locus where it is desired to measure the temperature.

Container 2 is preferably of shape and size identical to a food package the temperature of which is to be measured. This has many advantages apparent in FIG. 2. Referring to this figure, packing case 7 is completely filled with identical food packages 8, except that one food package is replaced by telemetering unit 1. (In the figure several packages 8 have been removed for illustrative purposes.) Probe 4 is inserted adjacent one of the food packages, preferably one deep within the case. It is to be noted that since the telemeter unit 1 in its container is the exact size of the food packages 8, the case is snugly filled and may be handled just as an ordinary case filled only with food packages. In such handling there will be no rattling or displacement of either the telemetering unit 1 or probe 4.

In a practice of the invention, case 7 filled as described above is simply allowed to be processed as would be the situation were it just filled with food packages. However, since telemeter unit 1 is continuously transmitting data on the temperature to which probe 4 is subjected, this information can be received and recorded as desired, furnishing an accurate and continuous log of the temperature to which the food is subjected. For example, if case 7 is placed in a freezer, the transmitted signal will inform the operator when the food has been frozen so that it is ready to be taken out of the freezer. The case 7 may be moved into a refrigerated warehouse and the temperature of the food checked from time to time by receiving the signals from the telemeter 1 to see that the conditions are proper for optimum storage of the food.

The way in which the invention may be applied in a food processing plant is illustrated in FIG. 3. Referring to this figure, enclosure 9 is a portion of the manufacturing plant provided with blast freezer 10 and refrigerated warehouse 11. Within freezer 10 is a pallet load 12 of food to be frozen. The load includes case 7 (assembled as illustrated in FIG. 2) and cases 13, the latter being ordinary cases packed with packages of food. Within refrigerated warehouse 11 are several pallet loads (14, 15) of food packages in cases. One or more of the cases may be assembled as illustrated in FIG. 2. Cases containing telemetering units are designated 7a, 7b, etc.; the remainder of the cases contain only food packages.

About the roof of enclosure 9 is arranged antenna 17 connected to radio receiver 18. The telemetering units in cases 7, 7a, 7b, 7c, and 7d are each tuned to a different frequency (for example, 100, 110, 120, 130, and 140 kc., respectively) so that the temperature of the food in any pallet load can be ascertained by tuning receiver 18 to the frequency of the telemetering unit associated with the load in question.

Tuning of the receiver 18 and noting of the telemeter signals may be accomplished by manual adjustment and observation. In the alternative, receiver 18 may be equipped with means for automatically tuning to each telemetering unit and recording on a chart the temperature at each location. In this way a record of the various temperatures at any desired time intervals may be obtained.

With the circuit employed in the described telemetering unit, receiver 18 is of the type which employs components to demodulate the signal, and measure the frequency of the modulating portion of the received signal.

Reference is now made to FIG. 4 which depicts the wiring diagram of the telemetering units. Transistor 20 operates in a conventional oscillator circuit radiating a carrier R.F. signal of about 100 kc. by tuned coil 21. The oscillator is operated in a self-quenched condition so that the carrier frequency is modulated at audio frequencies in the range of about 200-600 cycles. Probe 4 is a thermistor unit which exhibits a negative temperature coefficient. As the resistance of probe 4 changes (due to changes of its temperature) the carrier modulation frequency changes. For example, a higher temperature will modulate the carrier with a higher frequency audio signal, and vice versa. Variable resistors 22, 23 are provided to adjust the response of the system and to calibrate the device.

A compensating feature is provided by thermistor 24. This device compensates for temperature changes of the transmitting device itself. In the absence of this feature, the transmitted signal would indicate at least in part the temperature to which the transmitter is exposed because various of the circuit components, such as resistors, are affected to some degree by temperature. However, thermistor 24 is so arranged in the circuit that it counteracts any such temperature influences and ensures that the transmitter will radiate a uniform signal regardless of the temperature to which it is exposed. Thereby one is assured that the signal produced respresents only the temperature at probe 4 and is completely independent of the temperature to which the transmitter unit is subjected.

Power supply for transistor 20 is provided by an arrangement of battery 25, transistors 26 which convert the battery current into alternating current, transformer 27 which steps the A.C. up to about 20 volts and germanium rectifier 28. Battery 25 is preferably of the silver-zinc alkaline type which is operative at subfreezing temperatures.

The feature of employing a temperature-sensing probe which may be placed in a desired locus has distinct advantages over any system wherein the probe is simply part of the telemetering unit. The main point is that with the arrangement of the invention, the actual temperature of a food package can be determined, whereas with an integral probe, the measurement actually represents the temperature of the telemetering unit, not of the food package itself. This situation can be visualized by a realization that the telemeter unit and a food package are different as regards (a) the amount of solid matter in each, (b) the specific heat of each, and (c) the fact that the food has a latent heat of fusion whereas the telemeter unit has nothing similar. To further illustrate this point, assume that one has two cases of frozen food packages all at 20° F. Assume further that one food package is removed from case A and replaced by a telemetering unit having an integral probe and that one food package is removed from case B, replaced by the telemetering unit of the invention, the probe being placed between two food packages in the case. Both cases are then placed in an environment at 70° F. It will be observed that the temperature indicated by unit A will rise rapidly and regardless of the slow rise of the actual food temperature. For example, when the food reaches 32° F. a long period of constant temperature will prevail as ice is melted into water without temperature change. The unit A cannot possibly reflect this phenomenon because it does not itself possess a heat of fusion; it will indicate, falsely, rising temperature. On the other hand, unit B, in accordance with the invention, will follow the true temperature of the food because the probe is in a position where it measures the food temperature, not the temperature of the telemeter unit.

In the modification of the telemetering circuit depicted in FIG. 4, temperature information as sensed by probe 4 is continuously broadcast. In an alternative form of the invention, a circuit arrangement is employed which provides a signal only when a predetermined temperature is sensed by a probe. To this end, the circuit shown in FIG. 4 is modified as follows: Wires 5, 6 and probe 4 are disconnected. The connection between terminal 30 and the positive terminal of battery 25 is broken. These terminals are then connected to probe 4a as illustrated in FIG. 5. Referring to this figure, the positive terminal of battery 25 is connected by wire 31 to thermostatic switch element 32. Terminal 30 is connected by wire 33 to contact 34. Switch element 32 is of the thermostatic type, for example a bimetallic strip, whereby it will open or close at a predetermined temperature depending on whether it is normally biased in closed or open position. This system is used where a complete time-temperature history is not desired but only an indication that the commodity has reached a desired temperature. For example, in freezing a case of food, the telemetering unit may be disposed as above described and with switch 32 biased in the open position and adjusted to close the circuit when the temperature falls to say 0° F. The case is put in the freezer and in the period before the temperature of the food drops to the predetermined level, switch 32 will remain open so that the telemeter unit is inoperative. When the temperature of the food is reduced to 0° F., the switch 32 will close and the telemeter will broadcast the radio signal which can be picked up by a suitable receiver and converted by known means into a visible or audible signal. The operator would then know that the food is properly frozen. It is obvious that the device can be used in similar manner by suitable adjustment of switch 32 to provide a signal that a quantity of food is attaining too high a temperature, for example, as might be encountered in storage, shipping, etc. It is obvious that in using this modification of the invention, switch 32 may be normally biased in closed position to furnish an indication of a predetermined temperature by cessation of the signal from the telemeter or, conversely, switch 32 may be normally biased in open position to furnish an indication of a predetermined temperature by initiation of the telemeter signal. The latter is preferred as it spares the battery. In applying the circuit arrangement of FIG. 5, the transmitting unit and probe 6a are disposed in a case of food packages exactly as described above in regard to the first-mentioned modification.

Having thus described the invention, what is claimed is:

1. A system for ascertaining the temperature of individual packages of a commodity, each of said packages being within a case holding a plurality of similar packages, the cases being distributed at various localities within an area, which comprises a plurality of telemetering units, each telemetering unit being provided with a temperature-sensing probe and an independently-powered, automatically-operating, temperature-compensated transmitter for transmitting a radio signal as dictated by the temperature to which the probe is exposed, each transmitter being within one of said cases and within a container of size and shape identical to one of the commodity packages, remaining space in the case being filled with said commodity packages, each probe extending from the respective telemeter container and being adjacent one of the central commodity packages in the same case, cases containing a telemeter container and commodity packages being distributed in one or more localities where it is desired to ascertain the commodity temperature, and receiver means for receiving the signals transmitted by said transmitting units.

2. A system for ascertaining the temperature of individual food packages, each package being within a case holding a plurality of similar packages, the cases being distributed at different localities in an area, which comprises a plurality of independently-powered, automatically-operating telemetering units, each telemetering unit being provided with a temperature-sensing probe and a transmitter for transmitting a radio signal the characteristics of which are governed by the temperature to which the probe is exposed, each telemetering unit being within one of said cases and each transmitter being within a container having size and shape identical to those of a food package, remaining space in the case being filled with said food packages, each probe extending from the respective telemeter container and being adjacent one of the food packages in the same case, cases containing a telemeter unit being place in each of said different localities, individual telemetering units being pre-tuned to different frequencies, and receiver means for receiving the signals transmitted by said transmitter units.

3. A device for furnishing information as to the temperature within a case filled with commodity packages, comprising a telemetering unit, said unit including a temperature-sensing probe and an independently-powered, automatically-operating, temperature-compensated transmitter for transmitting a radio signal as dictated by the temperature to which the probe is exposed, the transmitter being wholly encased within a container of identical size and shape as one of said commodity packages, said container with the transmitter therein being adapted to fit into said case by removal of one of said commodity packages, said probe extending out of said transmitter container and adapted for placement adjacent to one of said commodity packages within said case.

4. A unitary case of a perishable commodity and self-contained means for communicating to the exterior the temperature of the commodity therein comprising: a case; a plurality of commodity-containing packages within the case; an independently-powered, automatically-operating, temperature-compensated radio transmitter unit within the case; a temperature-sensing probe within the case, spaced from the transmitting unit and disposed adjacent one of said commodity-containing packages; and means connecting said probe with said transmitting unit.

5. A unitary, transportable case containing within it a perishable commodity and self-contained means for communicating to the exterior the temperature of the commodity therein, comprising: A case, a plurality of packages of perishable commodity within the case, a telemetering unit within the case, said telemetering unit including a temperature-sensing probe and an independently-powered, automatically-operating, temperature-compensated radio transmitter for transmitting a radio signal as dictated by the temperature to which the probe is exposed, said transmitter being within a container of size and shape identical to one of the said commodity packages, remaining space within the case being snugly filled with said commodity packages, the said probe extending from the transmitter container and being adjacent to one of the central commodity packages in said case.

References Cited in the file of this patent

UNITED STATES PATENTS

| | | |
|---|---|---|
| 2,418,836 | Hawes | Apr. 15, 1947 |
| 2,509,215 | Craig | May 30, 1950 |
| 2,591,600 | Pear | Apr. 1, 1952 |
| 2,731,627 | Herbst | Jan. 17, 1956 |
| 2,741,099 | Beane | Apr. 10, 1956 |
| 2,787,685 | Washburn | Apr. 2, 1957 |
| 2,923,786 | Jones | Feb. 2, 1960 |